(12) United States Patent
Duke

(10) Patent No.: US 11,107,297 B2
(45) Date of Patent: Aug. 31, 2021

(54) MERGING DISCRETE TIME SIGNALS

(71) Applicant: Simmonds Precision Products, Inc., Vergennes, VT (US)

(72) Inventor: Alan M. Duke, Ferrisberg, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 364 days.

(21) Appl. No.: 16/218,145

(22) Filed: Dec. 12, 2018

(65) Prior Publication Data

US 2020/0193724 A1    Jun. 18, 2020

(51) Int. Cl.
*G07C 3/06*    (2006.01)
*G07C 7/00*    (2006.01)

(52) U.S. Cl.
CPC ........ *G07C 3/06* (2013.01); *G07C 7/00* (2013.01)

(58) Field of Classification Search
CPC . G07C 3/06; G07C 7/00; H04L 43/50; G01M 13/00; G01D 21/02; G06K 9/624; G05B 23/0221
See application file for complete search history.

(56) References Cited

U.S. PATENT DOCUMENTS 7,449,858 B2 * 11/2008 Chang ................ G01R 31/2829
                                                                   244/195
9,848,800 B1 * 12/2017 Lee ........................ A61B 5/0816
(Continued)

FOREIGN PATENT DOCUMENTS

CN    1987944    *   6/2007  ............. G08B 17/06
CN    1988524    *   6/2007  ............. H04L 27/26
(Continued)

OTHER PUBLICATIONS

Extended European Search Report for European Patent Application No. EP19215350.0, dated May 6, 2020.
(Continued)

*Primary Examiner* — Tung S Lau
(74) *Attorney, Agent, or Firm* — Locke Lord LLP; Scott D. Wofsy; Judy R. Naamat

(57) ABSTRACT

A method of monitoring a condition of a system is provided. The method includes receiving a first sampled signal having first sampled points sampled at a first sampling rate, and receiving a second sampled signal having second sampled points sampled at a second sampling rate. Both the first and second sampled signals originate from sensing over a dimension in the same sensing process. The method further includes determining a first shift over the dimension between the first sampled signal and the second sampled signal at a first sampled point of the first sampled signal, determining a second shift over the dimension between the first sampled signal and the second sampled signal at a second sampled point of the first sampled signal, the second sampled point being different than the first sampled point, determining a calculated shift that is a function of the first shift and the second shift, generating a merged signal that includes each of the first sampled points and each of the second sampled points shifted based on the calculated shift, determining whether there is at least a threshold indication of failure based on analysis of the merged signal, and disabling or recommending for removal the component in response to determining that there is at least a threshold indication of failure.

20 Claims, 9 Drawing Sheets

(56) References Cited

U.S. PATENT DOCUMENTS

| | | | |
|---|---|---|---|
| 2011/0082568 A1 | 4/2011 | Schulte | |
| 2013/0083960 A1 | 4/2013 | Kostrzewski et al. | |
| 2014/0195199 A1 | 7/2014 | Uluyol | |
| 2016/0292302 A1* | 10/2016 | Martin | G06F 16/2477 |
| 2018/0349086 A1* | 12/2018 | Chakra | H04W 64/00 |

FOREIGN PATENT DOCUMENTS

| | | | | |
|---|---|---|---|---|
| CN | 101227256 | * | 7/2008 | H04B 1/70757 |
| CN | 101839722 | * | 9/2010 | |
| CN | 104461688 | * | 3/2015 | G06F 9/455 |
| CN | 104809463 | * | 7/2018 | G06K 9/6269 |
| CN | 108830331 | * | 11/2018 | G01V 3/12 |
| CN | 110520827 | * | 11/2019 | G02B 26/105 |

OTHER PUBLICATIONS

Manuel Huber, Manuel, et al., "Temporal calibration in multisensor tracking setups", Mixed and Augmented Reality, 2009. ISMAR 2009. 8th IEEE International Symposium On, Oct. 1, 2009 (Oct. 1, 2009), pp. 195-196, XP055560811, Piscataway, NJ, USA DOI: 10.1109/ISMAR.2009.5336465, ISBN: 978-1-4244-5390-0.

* cited by examiner

MERGING DISCRETE TIME SIGNALS

BACKGROUND OF THE INVENTION

1. Field of the Invention

The present disclosure relates to signal processing, and more particularly to temporally dynamic fusion of signals of different qualities.

2. Description of Related Art

Condition monitoring systems monitor parameters in machinery for detecting the development of faults. Data collection systems are used to collect sensor measurements of dynamic parameters associated with a component system of the machine. Such parameters can include, for example temperature, pressure, vibration, and many other types of sensors. The data collection systems may not have the sampling, transfer, and/or storage capacity needed by the condition monitoring system. The output of the data collection systems can be output to a common destination for further fault detection analysis. The common destination can include a recording system that provides the output to a fault detection analysis system.

Two or more data collection systems can operate on a single signal. The output of the two or more data collection systems can be sampled at different rates and/or shifted in time relative to one another, yet each having valuable information that may complement the other. It can be challenging for the fault detection analysis to take advantage of the information output by multiple data collection systems that operated on the same signal when the outputs are sampled at different rates, and may also be shifted in time.

While conventional methods and systems have generally been considered satisfactory for their intended purpose, there is still a need in the art for a system and method that preserve information provided by multiple signals originating from the same source but was sampled at different rates before being provided to a fault detection analysis system.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims thereof, as well as from the appended drawings. To achieve these and other advantages and in accordance with the purpose of the illustrated embodiments, in one aspect, disclosed is a method of monitoring a condition of a system is provided. The method includes receiving a first sampled signal having first sampled points sampled at a first sampling rate, and receiving a second sampled signal having second sampled points sampled at a second sampling rate. Both the first and second sampled signals originate from sensing over a dimension in the same sensing process. The method further includes determining a first shift over the dimension between the first sampled signal and the second sampled signal at a first sampled point of the first sampled signal, determining a second shift over the dimension between the first sampled signal and the second sampled signal at a second sampled point of the first sampled signal, the second sampled point being different than the first sampled point, determining a calculated shift that is a function of the first shift and the second shift, generating a merged signal that includes each of the first sampled points and each of the second sampled points shifted based on the calculated shift, determining whether there is at least a threshold indication of failure based on analysis of the merged signal, and disabling or recommending for removal the component in response to determining that there is at least a threshold indication of failure.

In embodiments, the first sampled point can have a corresponding measured value MV1. Determining the first shift can include selecting third and fourth consecutive sampled points of the second plurality of sampled points, the third and fourth sampled points having respective corresponding measured values MV3 and MV4, wherein the condition MV3≤MV1<MV4 can be satisfied. The method can further include determining a first line having a first slope and a first intercept that passes through the third and fourth sampled points, determining a first point on the first line that has measured value MV1, determining the first shift to be a first distance between the a first dimension value DV1 that corresponds to the first sampled point and a second dimension value DV2 that corresponds to the first point.

In embodiments, the second sampled point can have a corresponding measured value MV1, and determining the second shift can include selecting third and fourth consecutive sampled points of the second plurality of sampled points. The third and fourth sampled points can have respective corresponding measured values MV3 and MV4, wherein the condition MV3≤MV1<MV4 can be satisfied. The method can further include determining a first line having a first slope and a first intercept that passes through the third and fourth sampled points, determining a first point on the first line that has measured value MV1, and determining the second shift to be a first distance between the a first dimension value DV1 that corresponds to the first sampled point and a second dimension value DV2 that corresponds to the first point.

In embodiments, the method further includes selecting the first and second sampled points along a ramped portion of the first sampled signal.

In embodiments, the first and second sampled points can be not consecutive sampled points.

In embodiments, the first and second sampled points can be consecutive sampled points.

In embodiments, the method can further include sampling the merged signal to generate a third plurality of sampled points, wherein determining whether there is at least the threshold indication of failure is performed by analyzing the third plurality of sampled points.

In accordance with still another aspect of the disclosure, a condition monitoring system comprising having a memory configured to store instructions and a processor disposed in communication with the memory is provided. The processor, upon execution of the instructions is configured to perform the operations of the method.

In accordance with still another aspect of the disclosure, a non-transitory computer readable storage medium having one or more computer programs stored therein is provided. The computer programs associated with each layer comprising instructions, which when executed by a processor of a computer system, cause the processor to perform the operations of the method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
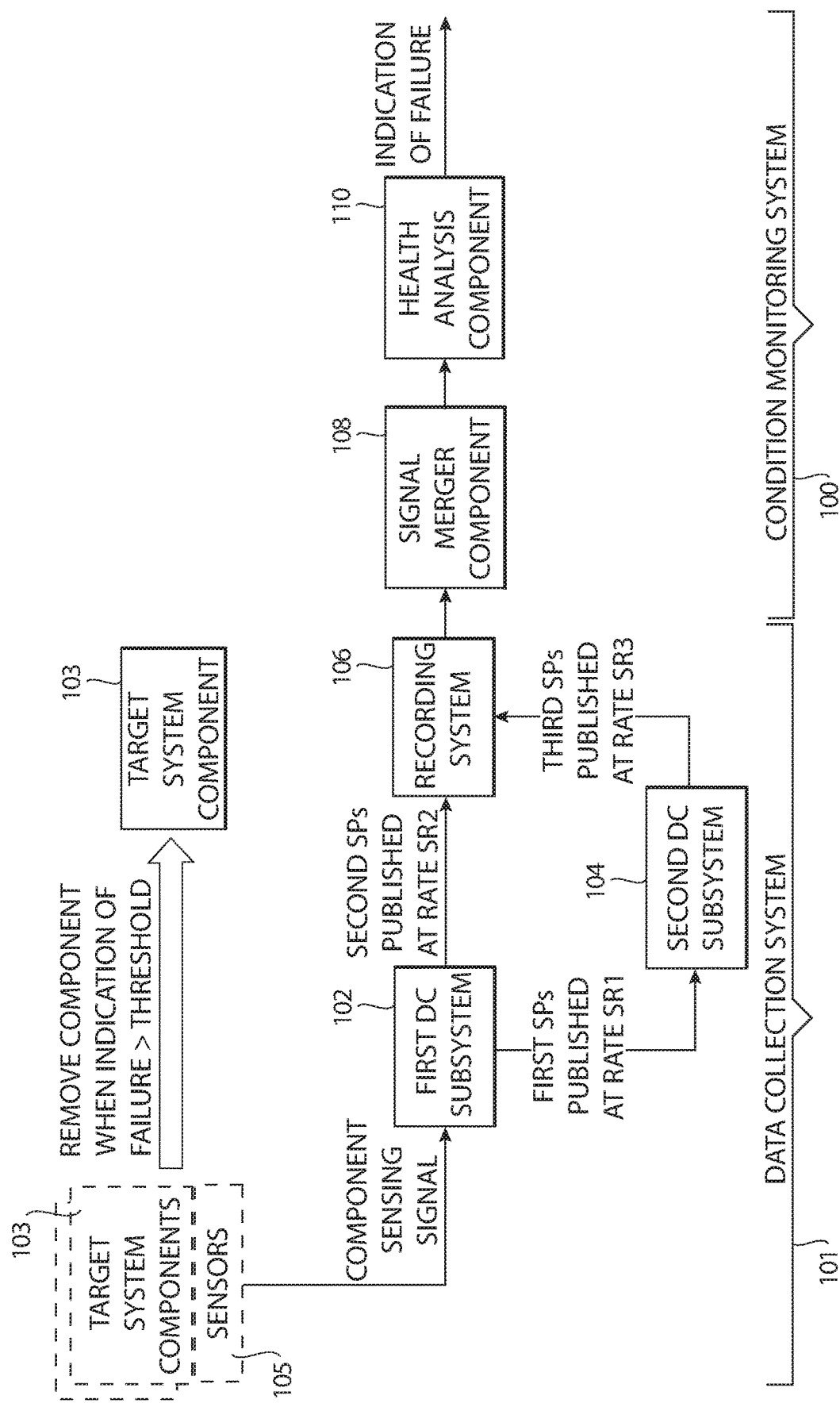
FIG. 1 is a block diagram of an exemplary embodiment of a condition monitoring system, in accordance with embodiments of the disclosure.

Reference will now be made to the drawings wherein like reference numerals identify similar structural features or aspects of the subject disclosure. For purposes of explanation and illustration, and not limitation, a block diagram of an exemplary embodiment of a condition monitoring (CM) system in accordance with the disclosure is shown in FIG. 1 and is designated generally by reference character 100. Methods associated with operations of the CM system 100 in accordance with the disclosure, or aspects thereof, are provided in FIGS. 2-9, as will be described. The systems and methods described herein can be performed in real time, before recording to a recording system, or offline on data that was recorded by a recording system.

The CM system 100 includes a signal merger component 108 and an analysis component 110 that operate on output from a data collection (DC) system 101 for merging multiple signals that are different versions of a same source signal.

The data collection (DC) system 101 includes one or more sensors 105 deployed in relationship to a target system component 103 being monitored, two or more DC subsystems, such as first DC subsystem 102 and a second DC subsystem 104, and a recording system 106. The sensors 105 output signals that represent measurements of physical characteristics. The DC first and second subsystems 102 and 104 process and calculate information in the signals, and recording system 106 stores the output of the DC subsystems. Additional sensors, DC subsystems and recording systems can be included in the data collection system 101.

The component 103 of the target system can be, for example, a component of an electrical system, a temperature control system, a hydraulic system, an engine system, etc. of a mobile or stationary system, such as an aircraft, automobile, energy plant, etc. The sensors 105 sense physical characteristics, such as linear speed, rotational speed, temperature, vibrations, pressure, etc. The sensors output dynamic signals that have a magnitude relative to a dimension. The dimension can be, for example, time, distance, e.g., along an x, y, or z axis of the Cartesian coordinate system.

Certain data collection systems, such as legacy data collection systems, are not designed to support conditioning monitoring systems, such as for application of prognostic and health management (PHM) algorithms. Signals output by such data collection systems can be under sampled, such as due to sampling, transfer, and/or storage limitations, and therefore may be inadequate for performance of condition monitoring.

In the example shown, each of first and second CM subsystems 102, 104 has its own task to perform on the component sensing signals, and may further have its own sampling requirements. The sampling performed by each of first and second CM subsystems 102, 104 may be inadequate for performance of condition monitoring, however a merged signal output by the signal merger component 108 based on the sampling performed by each of the first and second CM subsystems 102, 104 can have an increased apparent sample rate.

The challenges posed by the data collection system 101 are now described in greater detail. Each of the first and second DC subsystems 102 can sample, operate on, and/or publish a signal it receives. In the example shown, the first DC subsystem 102 receives the component sensing signal that was output by one of sensors 105. The first DC subsystem 102 samples the component sensing signal at a first rate SR1 to obtain first sample points, transmits the first sample points to the second DC subsystem 102 that were sampled at the first rate SR1, and publishes (or otherwise communicates) second sample points obtained by sampling the first sample points at a second rate SR2. The recording system 106 receives the published second sample points.

The second DC subsystem 104 receives the first sample points from the first DC subsystem 102, and publishes (or otherwise communicates to the recording system 106) third sample points that were re-sampled from the first sample points at a third rate SR3. The third sample points can be shifted (meaning delayed) relative to the first and/or second sample points, such as due to transmission or processing delays. These delays can vary over the dimension, e.g., time. The recording system 106 receives the first sample points and the third sample points, which are both versions of the same signal, namely the component sensing signal.

In embodiments, at least two of sampling rates SR1, SR2, SR3 are different rates. In embodiments, SR2≤SR1 and SR3≤SR1. Furthermore, in embodiments, SR2 and SR3 are not equal to one another. In embodiments, SR1, SR2, and SR3 are all different rates. In embodiments, SR2=SR3, but the signal output by the second DC subsystem 104 lags relative to the signal output by the first DC subsystem 102.

CM system 100 receives data collected by a data collection system 101 monitoring dynamic parameters in one or more target system components 103. The CM system analyzes output of the data collection system 101 to detect development of a fault.

This merged signal can be processed by the health analysis component 110 e.g., to perform condition monitoring. The health analysis component 110 can use the merged signal to perform condition monitoring and determine when there is an indication of failure associated with a particular component 103. Intervention can be provided to the particular component, such as removing and/or servicing the component 103.

In an example, the target system component 103 being monitored is a cabin air compressor of a cabin air conditioning and temperature control system (CACTCS). A sensor 105 is a speed sensor that senses motor speed. The component sensing signal is a motor speed signal. The first DC subsystem 102 is a common motor start controller (CMSC) that samples the motor speed signal at a first rate SR1 (e.g., 100 Hz) which is transmitted to the second DC subsystem 104. The CMSC further samples and publishes the motor speed signal at a second rate SR2 (e.g., 1 Hz). The second DC subsystem 104 is a pack control unit (PCU) that re-samples the sampled motor speed signal at a third rate SR3 (e.g., 1 Hz), causing further delays to the re-sampled motor speed signal, which it publishes. The recording system 106 is an aircraft parametric data recorder that records the published motor speed signal sampled at the second rate SR2 and sampled at the third rate SR3. These recorded signals both are sourced from the motor speed signal output by the speed sensor.

Figure 2:
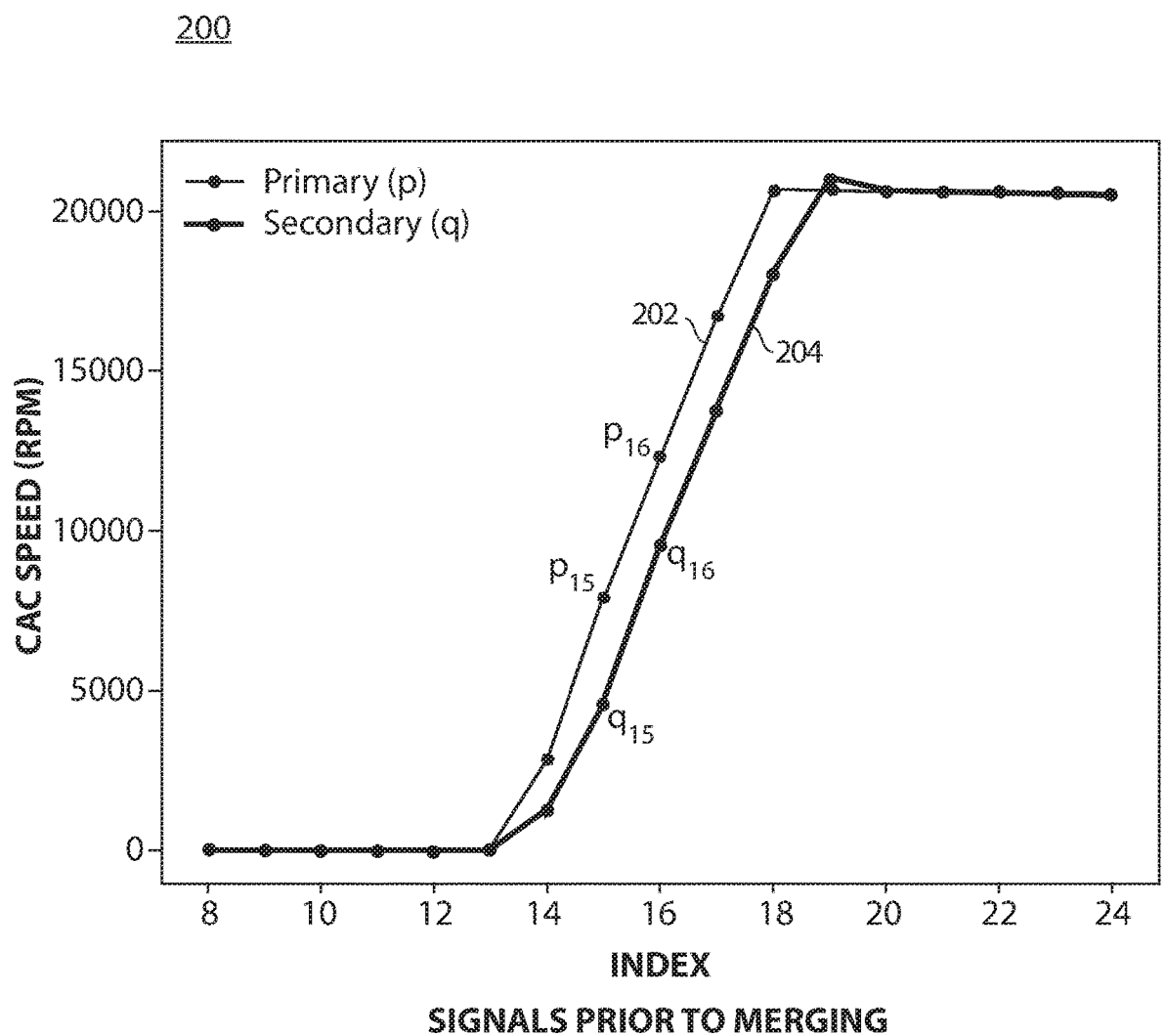
FIG. 2 is a graph of a plot of a portion of example sampled signals prior to merging, in accordance with embodiments of the disclosure.

FIG. 2 shows a graph 200 of primary sampled signal p 202 output by the first DC subsystem 102 and a secondary sampled signal q 204 prior to merging. The primary sampled signal p 202 represents output from first DC subsystem 102 and secondary sampled signal q 204 represents output by the second DC subsystem 104, each a plot of a measured value versus a dimension. In the example shown, the value is CAC speed (rpm), and the dimension is shown in indices of the samples that correlate to the dimension of time.

The primary and secondary sampled signals 202, 204 are similar to one another, with the secondary sampled signal 204 lagging relative to the primary sampled signal 202. The primary and secondary sampled signals 202, 204 are substantially equal to one another at the beginning and end of the graph (index=8-13 and 20-24). During a ramp phase (index=13-18), the primary and secondary sampled signals 202, 204 are relatively linear and parallel, and lag of the secondary sampled signal 204 relative to the primary sampled signal 202 is evident. An objective of the disclosure is to shift sample points of the secondary sampled signal 204 to the left so that the secondary sampled signal 204 will align with the primary sampled signal 202, and then to combine the sample points of both primary and secondary signals sampled 202, 204 into a merged signal (see FIGS. 5 and 6).

Figure 3:
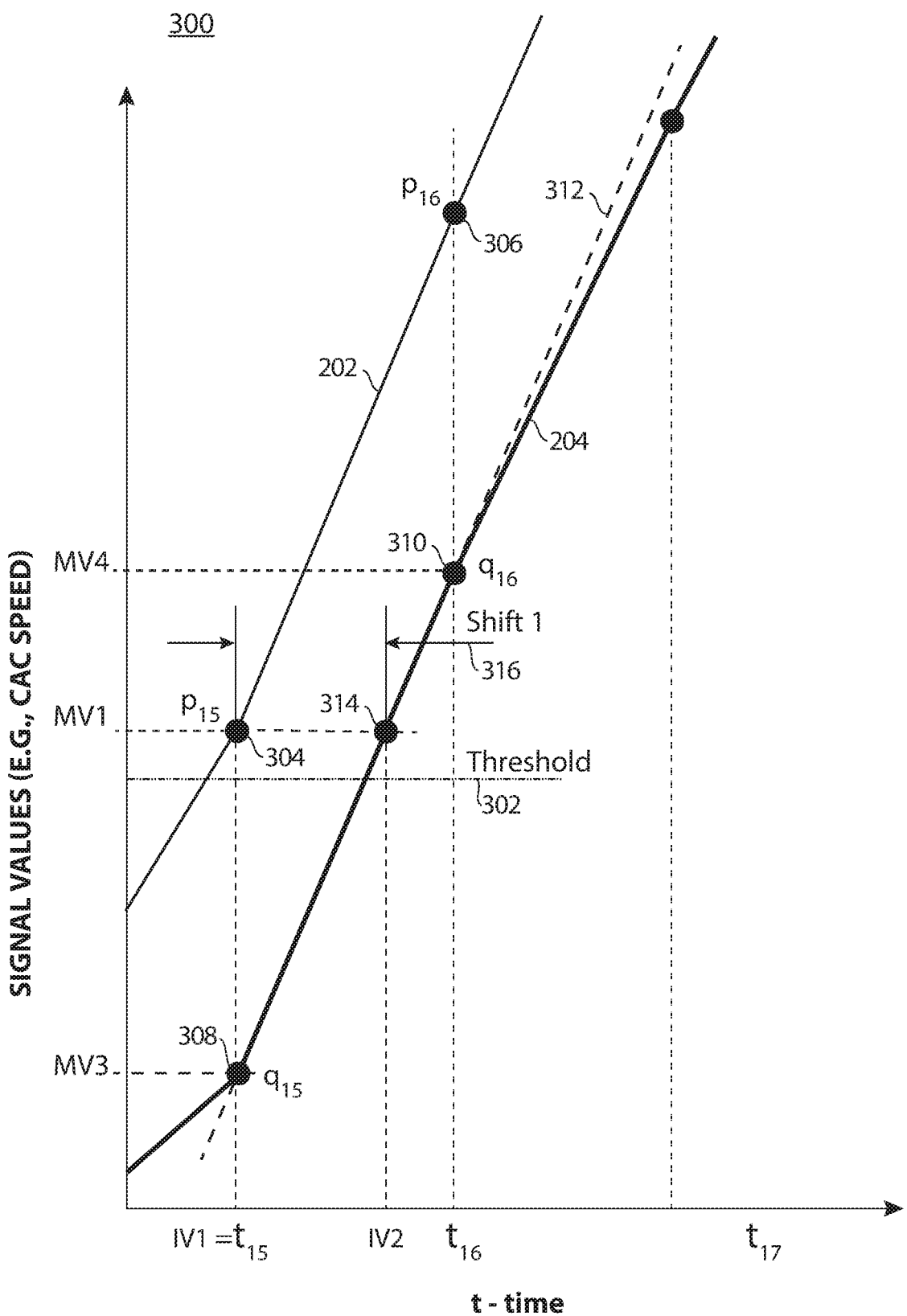
FIG. 3 is the graph of the plot shown in FIG. 2 showing an example first shift between the sampled signals, in accordance with embodiments of the disclosure.

FIG. 3 shows a graph 300 that is an enlarged version of a portion of the ramp phase of graph 200. The indices 15-17 are labeled t_15-t_17, each index representing an increment in time, e.g., one second. A first shift 316 is determined between the primary and secondary sampled signals p 202, q 204 over the indices, which correlate to the dimension of time. The first shift 316 is determined at a selected first sampled point 304 (p_i sampled at T_15) of primary sampled signal p 202, wherein i=index (the time increment), sampled point p_i corresponds to the signal value at index i, and t_i is time at index i. Then a second shift 324 is determined at a selected second sampled point 306 (p_i+1) of primary sampled signal p 202.

Figure 4:
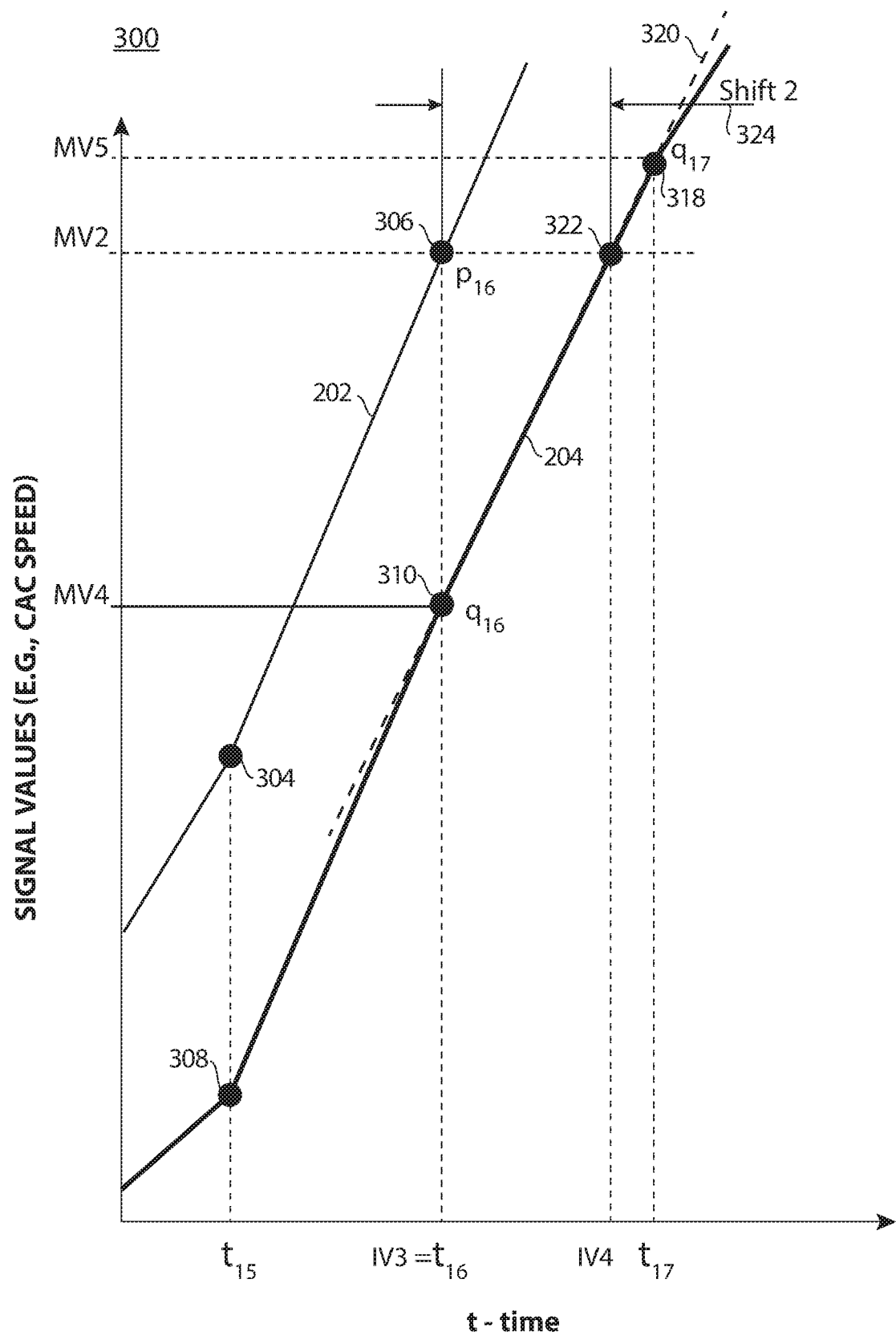
FIG. 4 is the graph of the plot shown in FIG. 2 showing an example second shift between the sampled signals, in accordance with embodiments of the disclosure.

In FIG. 4, the second sampled point 306 is shown in this example as being a next subsequent point to the first sampled point 304, however the disclosure is not limited to a particular second sampled point. The second sampled point 306 could be selected to be the previous sampled point p_i−1, or could be spaced further from the first sampled point 304, such as at p_i+n or p_i-n. The requirement is that each of the first and second sampled points 304, 306 be spaced from one another and are situated on the ramp phase of primary sampled signal p 202. Additionally, secondary sampled signal q 204 is also required to be in its ramp phase at sampled points above and below the value of the first and second points 304, 306.

The first and second sampled points 304, 306 are selected to both be on the ramped phase of primary sampled signal p 202, and to enable selection of points on the secondary sampled signal q 204 on its ramped portion that can be used to determine the first and second shifts. An example method is described for selection of the first and second sampled points 304, 306, however the disclosure is not limited to this particular method. In the example shown, the first sampled point is selected to have a value greater than a value of a threshold 302. The threshold 302 is selected to intersect both primary and secondary signals 202, 204 in both of their ramp phases. This method requires the primary and secondary signals 202, 204 to have a period or phase where they vary in an approximately linear fashion. In the example shown, first point p_i 304 is p_15 that has a measured value of MV1, and the second point p_i+1 306 is p_16 that has a measured value of MV2.

Next, third and fourth consecutive sampled points 308, 310 of the secondary sampled signal q 204 are selected that have respective corresponding measured values MV3 and MV4, wherein MV3≤MV1<MV4. In the example shown, the third sample point is q_15 and the fourth sample point is q_16. A first line 312 is determined that passes through the third and fourth sampled points 308, 310, and the slope and intercept of the first line 312 are determined. A first point 314 is determined on the first line 312 that has the measured value MV1. The first shift 316 is determined to be a distance between a first index value IV1 that corresponds to the first sampled point 304 and a second index value IV2 that corresponds to the first point 314. In the example shown, IV1=t_15. This first shift 316 is the index difference (which represents time difference) between the primary and secondary sampled signals p 202, q 204 at the regions of the third and fourth sampled points 308, 310, such that the first shift 316 applied to the secondary sampled signal q 204 would align it with the first sampled signal p 202 at the first sampled point 304.

As shown in FIG. 4, the second shift 324 is determined. A fifth sample point 318 is selected on the secondary sampled signal q 204 that is consecutive with the fourth sampled point 310. In the example shown, the fifth sample point 318 is q_17 and has a measured value of MV5, wherein MV4≤MV2<MV5. A second line 320 is determined that passes through the fourth and fifth sampled points 310, 318, and the slope and intercept of the second line 320 are determined. A second point 322 is determined on the second line 320 that has the measured value MV2 and the index value IV4. The second shift 324 is determined to be a distance between a first index value IV3 that corresponds to the first sampled point 306 and the second index value IV4 that corresponds to the second point 322. In the example shown, IV3=t_16. This second shift 324 is the index difference (which represents time difference) between the primary and secondary sampled signals p 202, q 204 at the region of the fourth and fifth sampled points 310, 318, such that the second shift 324 applied to the secondary sampled signal q 204 would align it with the first sampled signal p 202 at the second sampled point 306.

A function is applied to the first shift 316 and the second shift 324 to obtain a calculated shift, such as averaging the first shift and second shift 324. Other example methods of combining first shift 316 and the second shift 324 are application of functions, such as minimum of, maximum of, or root sum squares functions. The secondary sampled signal q 204 is adjusted by shifting the index value (which corresponds to time) of each sample point by applying the calculated shift. In the example shown, the calculated shift is applied by subtracting the calculated shift from the index value of each sample point of the secondary sampled signal q 204.

Figure 5:
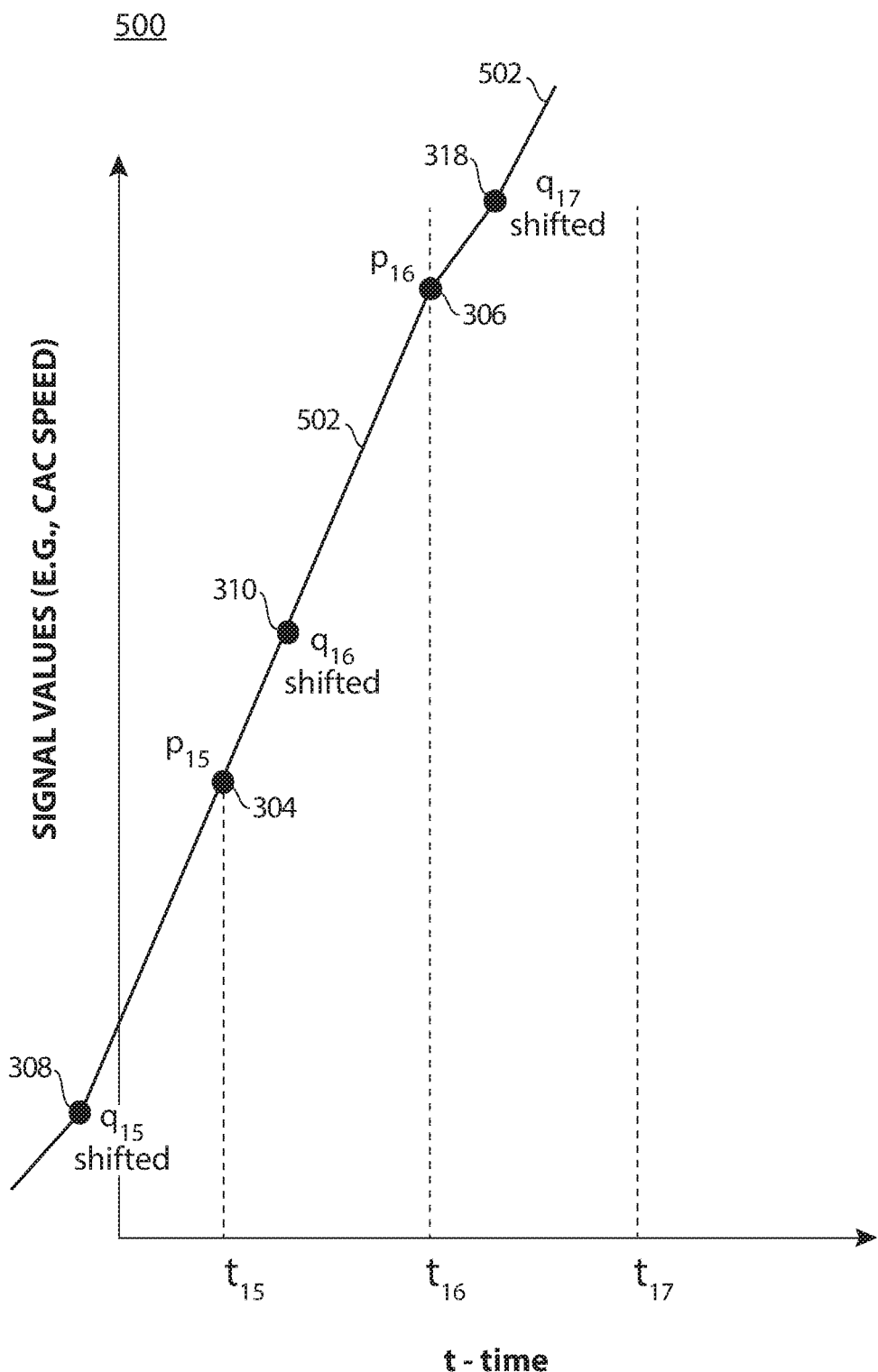
FIG. 5 is a graph of a plot of a portion of an example merged signal based on the sampled signals shown in FIG. 2, in accordance with embodiments of the disclosure.

With reference to FIG. 5, curve 500 shows a portion of merged signal 502 that includes the first and second sampled points 302 and 304 of the primary sampled signal p 202 and the shifted third, fourth, and firth sample points 308, 310, 318 of sampled signal q 204, all of which are concatenated together and sorted by their time values.

Figure 6:
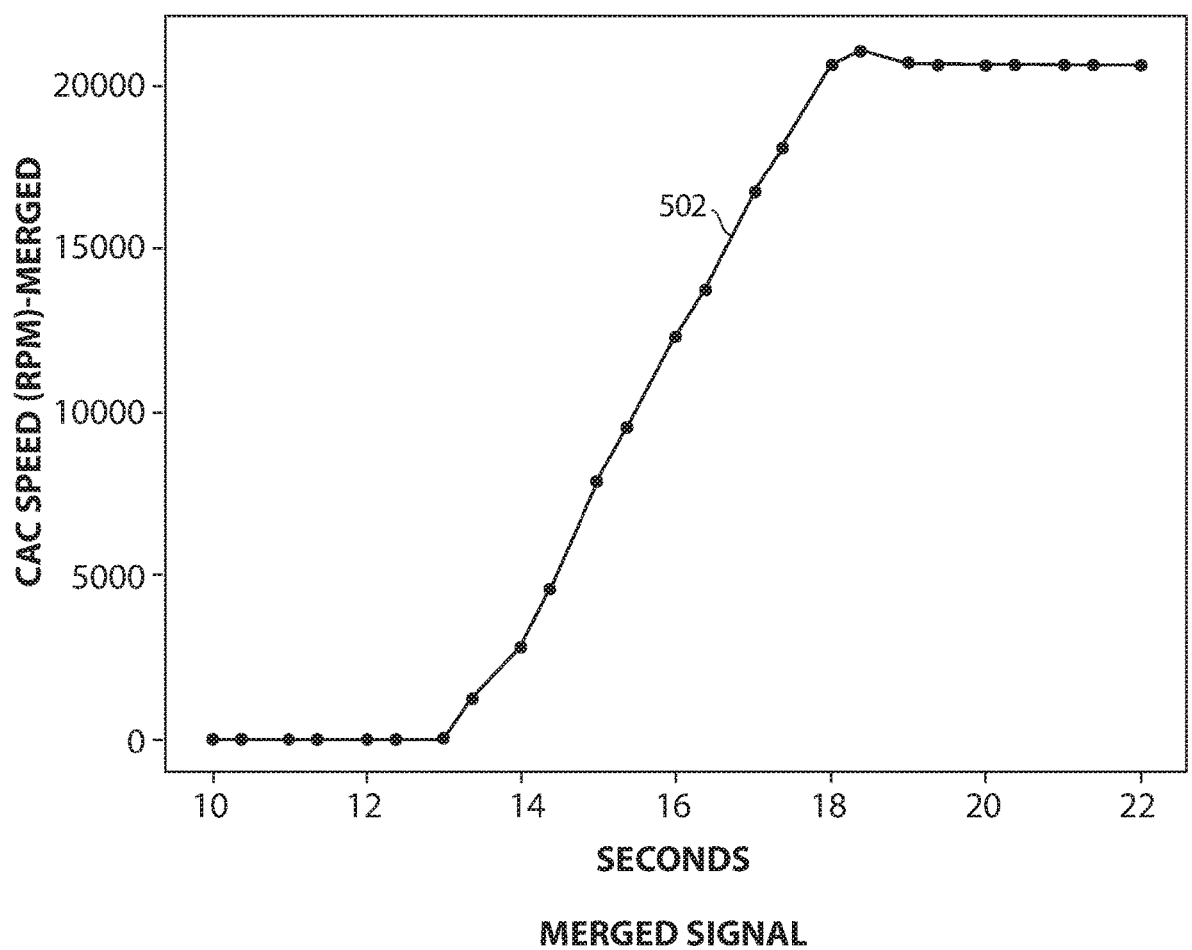
FIG. 6 is a graph of a plot of a different portion of the example merged signal shown in FIG. 5.

With reference to FIG. 6, curve 600 shows the merged signal 502 with more sampled points and shifted sampled points, including an entire ramped portion and non-ramped portions. The merged signal 502 is a higher fidelity signal that has a curve with better resolution due to a higher effective sampling rate than either of the primary and secondary sampled signals p 202, q 204. While the sampled points and shifted sampled points are not uniformly spaced in time, this can be addressed by resampling the merged curve at a fixed rate.

The merged signal 502 is analyzed by the health analysis component 110 for detection of development of a fault in the component monitored. The health analysis component 110 can analyze the merged signal 502 to estimate features of the component sensing signal, such as by determining an area under the curve of the merged signal 502. Other examples of features that can be derived from the merged signal are areas under selected portions of the curve, and the slope of the linear portion. The higher fidelity merged signal 502 enables the health analysis component 110 to attain a higher degree of accuracy for estimating such features and recognizing fault development. Upon detection of development of a fault, the health analysis component 110 issues an indication of failure, upon which the component or target system monitored is disabled or the component is recommended for servicing, which can include disabling the component and/or removing the component from the target system within which it resides or disabling the target system. Recommending for servicing can include performance of an action that causes the component to be tested, disabled, removed, and/or replaced. The action can be applied to the component or the target system or a system external to the target system.

In the example illustrated in FIGS. 2-6, the primary and secondary signals 202, 204 are sampled at the same times, however the disclosure is not limited to such concurrent sampling. The algorithm described functions accurately regardless of whether sampling is concurrent or not.

Figure 7:
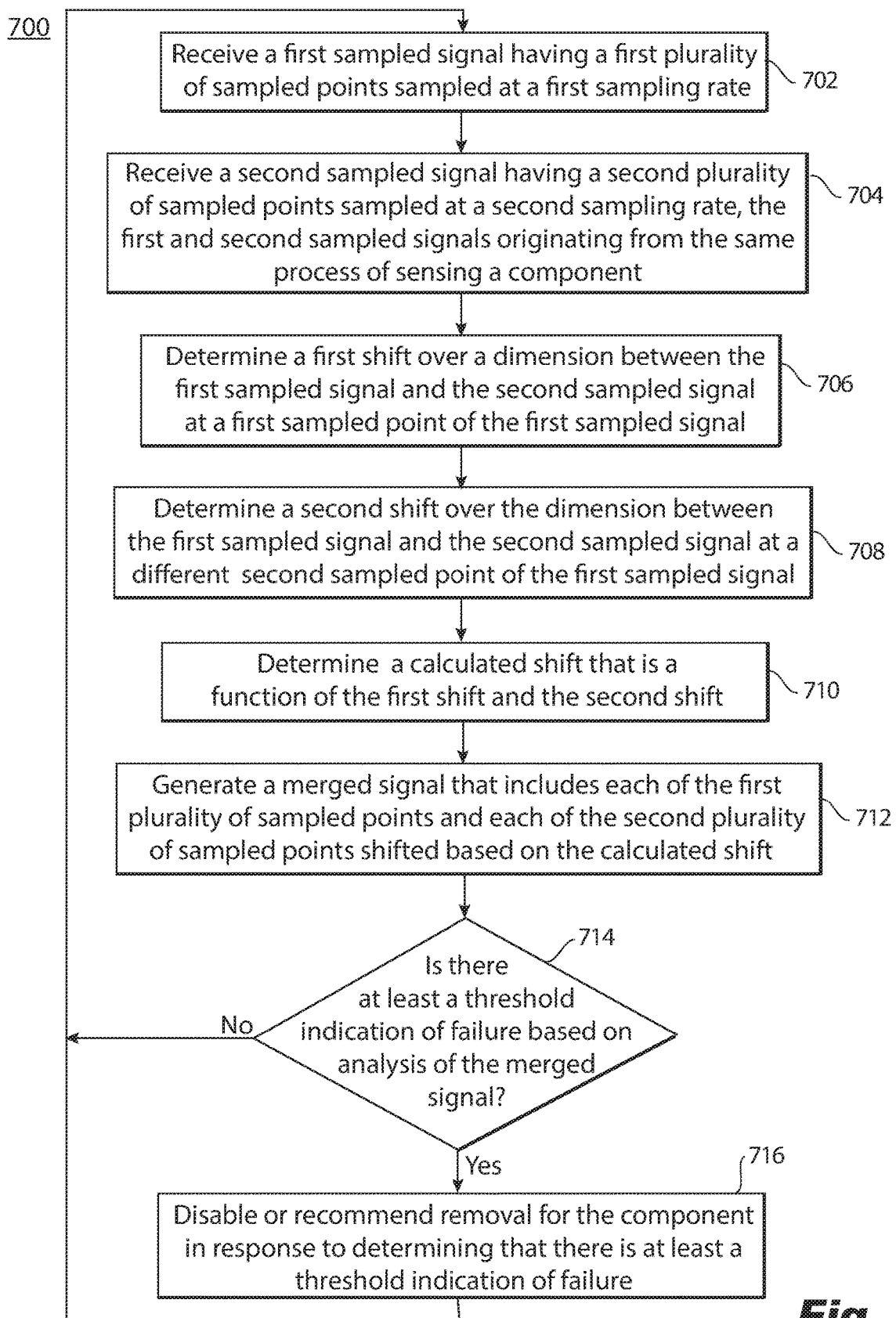
FIG. 7 is a flowchart of an example method of merging discrete time signals that were sampled at different rates, in accordance with embodiments of the disclosure.
Figure 8:
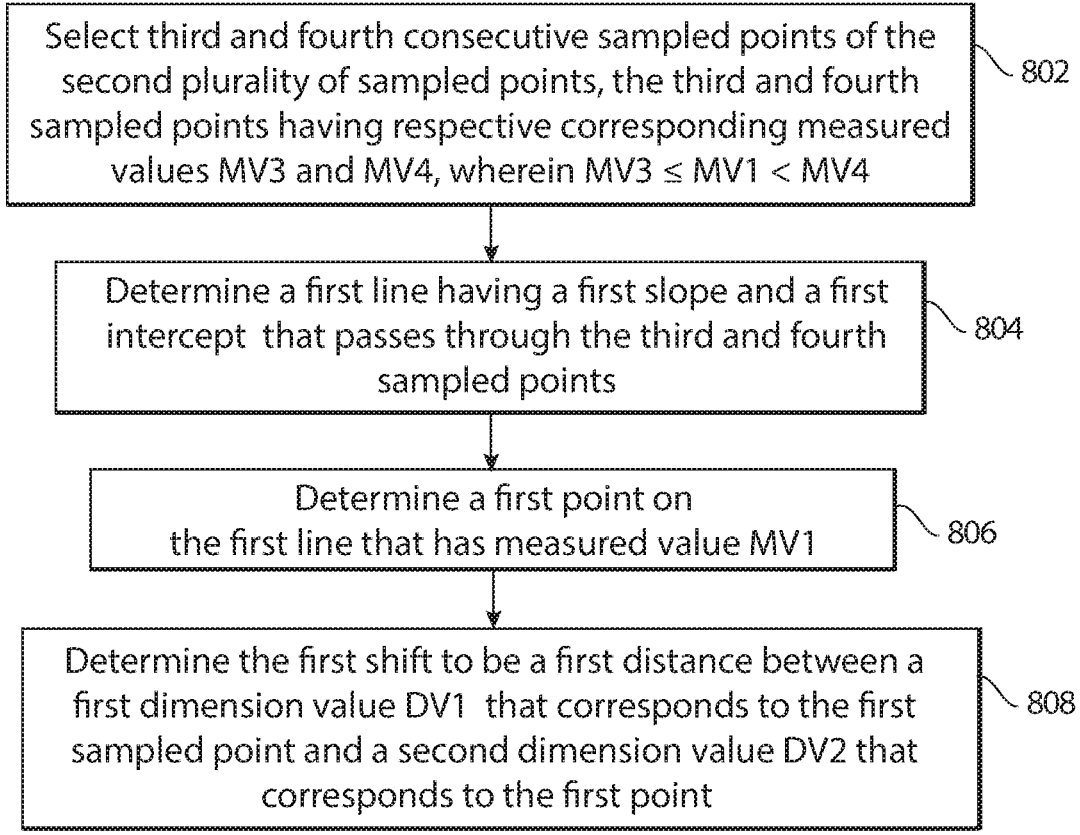
FIG. 8 is a flowchart of an example method of determining a shift for merging discrete time signals that were sampled at different rates, in accordance with embodiments of the disclosure.

With reference now to FIGS. 7 and 8, shown are flow diagrams demonstrating implementation of the various exemplary embodiments. It is noted that the order of operations shown in FIGS. 7 and 8 is not required, so in principle, the various operations may be performed out of the illustrated order or in parallel. Also certain operations may be skipped, different operations may be added or substituted, or selected operations or groups of operations may be performed in a separate application following the embodiments described herein.

FIG. 7 shows a flowchart 700 that illustrates an example method in accordance with an embodiment. The method can be performed by a CM system, such as CM system 100 shown in FIG. 1. At operation 702, a first sampled signal is received. The first sampled signal has a first plurality of sampled points sampled at a first sampling rate. Each first sampled point has an associated measured value and a dimension value. At operation 704, a second sampled signal is received. The second sampled signal has a second plurality of sampled points sampled at a second sampling rate, each of the second sampled points having an associated measured value and dimension value. The first and second sampled signals originate from the same process of sensing a component. At operation 706, a first shift is determined over a dimension, e.g., time, between the first sampled signal and the second sampled signal at a first sampled point of the first sampled signal. At operation 708, a second shift is determined over the dimension between the first sampled signal and the second sampled signal at a different second sampled point of the first sampled signal.

At operation 710, a calculated shift is determined that is a function of the first shift and the second shift. At operation 712, a merged signal is generated that includes each of the first plurality of sampled points and each of the second plurality of sampled points shifted based on the calculated shift. At operation 714, a determination is made whether there is at least a threshold indication of failure based on analysis of the merged signal. This determination is performed by analyzing the merged signal, which can include estimating features of the component sensed signal based on features of the merged signal. A feature of the merged signal can be compared to a threshold. If the determination is NO, meaning it was determined at operation 714 that there not a threshold indication of failure, the method can return to operation 702 to process sampled signals associated with additional monitoring, such as monitoring of other components. If the determination is YES, meaning it was determined at operation 714 that there is at least a threshold indication of failure, the component is disabled or recommended for removal. The method can continue at operation 702.

FIG. 8 shows a flowchart 800 that illustrates an example method performed by the signal processing system, in accordance with an embodiment. At operation 802, third and fourth consecutive sampled points of the second plurality of sampled points are selected. The third and fourth sampled points having respective corresponding measured values MV3 and MV4, wherein MV3≤MV1<MV4. At operation 804, a first line that passes through the third and fourth sampled points is determined. The first line has a first slope and a first intercept. At operation 806, a first point on the first line is determined. The first point has measured value MV1. At operation 808, the first shift is determined to be a first distance between a first dimension value DV1 that corresponds to the first sampled point and a second dimension value DV2 that corresponds to the first point.

Aspects of the present disclosure are described above with reference to flow diagram illustrations and/or block diagrams of methods, apparatus (systems) and computer program products according to embodiments of the disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

Figure 9:
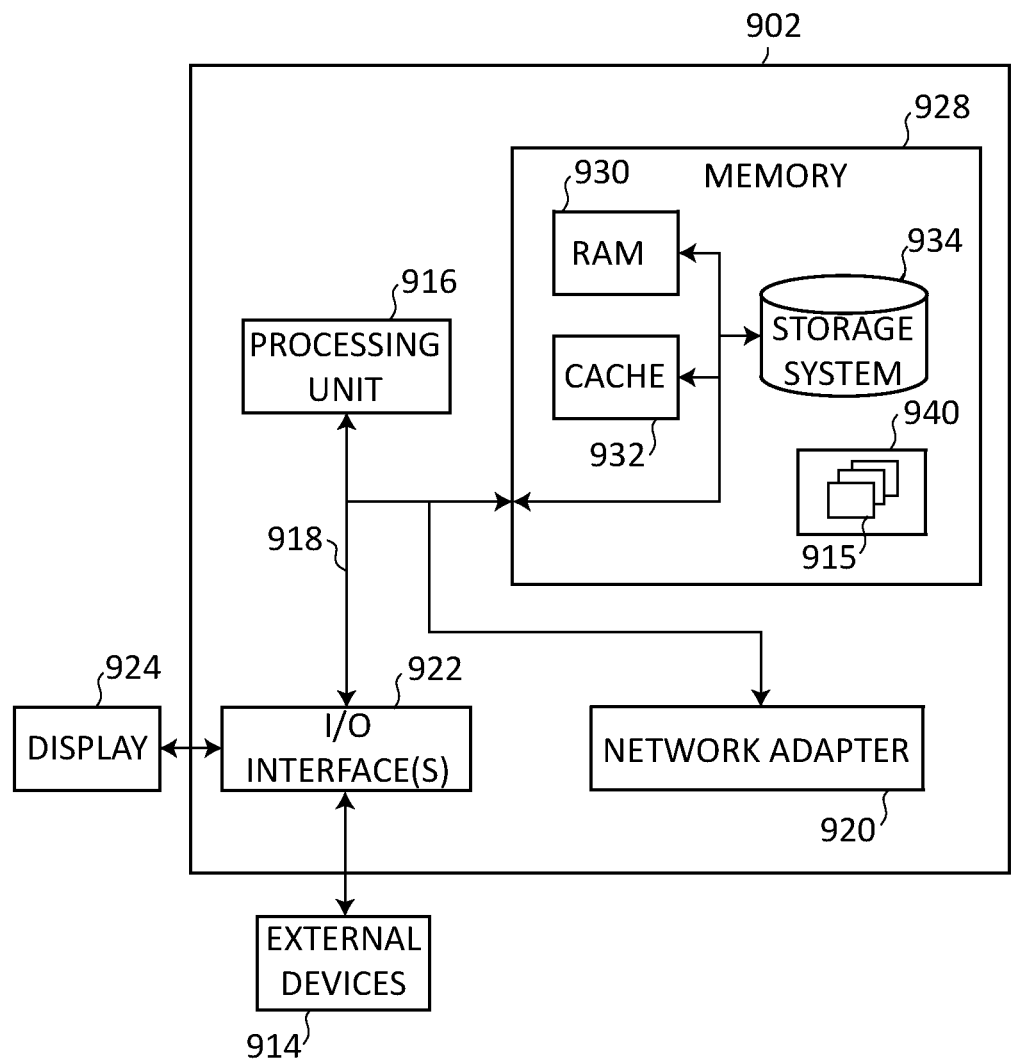
FIG. 9 is a block diagram of an exemplary computer system configured to implement a signal merger component of the condition monitoring system, in accordance with embodiments of the disclosure.

Embodiments of the signal merger component 108 may be implemented or executed by one or more computer systems, such as example computer system 902 illustrated in FIG. 9. Each computer system 902 can implement signal merger component 108, or multiple instances thereof. In various embodiments, computer system 902 may include a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 902 is only one example of a suitable system and is not intended to suggest any limitation as to the scope of use or functionality of embodiments of the disclosure described herein. Regardless, computer system 902 is capable of being implemented and/or performing any of the functionality set forth hereinabove.

Computer system 902 may be described in the general context of computer system-executable instructions, such as program modules, being executed by a computer system. Generally, program modules may include routines, programs, objects, components, logic, data structures, and so on that perform particular tasks or implement particular abstract data types. Computer system 902 may be practiced in distributed data processing environments where tasks are performed by remote processing devices that are linked through a communications network. In a distributed data processing environment, program modules may be located in both local and remote computer system storage media including memory storage devices.

Computer system 902 is shown in FIG. 9 in the form of a general-purpose computing device. The components of computer system 902 may include, but are not limited to, one or more processors or processing units 916, a system memory 928, and a bus 918 that couples various system components including system memory 928 to processor 916. Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 902 typically includes a variety of computer system readable media. Such media may be any available media that is accessible by the signal merger component 108, and it includes both volatile and non-volatile media, removable and non-removable media.

System memory 928 can include computer system readable media in the form of volatile memory, such as random access memory (RAM) 930 and/or cache memory 932. Computer system 902 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the disclosure.

Program/utility 940, having a set (at least one) of program modules 915, such as for performing the operations of flowcharts 700 and 800 shown in FIGS. 7 and 8, respectively, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 915 generally carry out the functions and/or methodologies of embodiments of the disclosure as described herein.

Computer system 902 may also communicate with one or more external devices 914 such as a keyboard, a pointing device, a display 924, etc.; one or more devices that enable a user to interact with computer system 902; and/or any devices (e.g., network card, modem, etc.) that enable the signal merger component 108 to communicate with one or more other computing devices. Such communication can occur via Input/Output (I/O) interfaces 922. Still yet, computer system 902 can communicate with one or more networks such as a local area network (LAN), a general wide area network (WAN), and/or a public network (e.g., the Internet) via network adapter 920. As depicted, network adapter 920 communicates with the other components of the signal merger component 108 via bus 918. It should be understood that although not shown, other hardware and/or software components could be used in conjunction with computer system 902. Examples, include, but are not limited to: microcode, device drivers, redundant processing units, external disk drive arrays, RAID systems, tape drives, and data archival storage systems, etc.

The flow diagram and block diagrams in the Figures illustrate the architecture, functionality, and operation of possible implementations of systems, methods and computer program products according to various embodiments of the present disclosure. In this regard, each block in the flow diagram or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the disclosed method the ability to process an signal that is enhanced and/or signals from disparate data collection systems having sensors that produce one or more fused signals, using a technique that takes advantage of strengths of each of the signals and/or signals output by the different data collection systems, while minimizing weaknesses in such signals. The method can be used for one, two or more data collection system. The fused signals are dynamic with respect to time, since the signals are evaluated and fused period by period. The method can be applied to streaming synchronized signals that are fused over time.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A method of monitoring a condition of a system, the method comprising:
   receiving a first sampled signal having a first plurality of sampled points that originated from a process of sensing a component of a system over a dimension, the first sampled signal being sampled at a first sampling rate, and each first sampled point having an associated measured value and a dimension value;
   receiving a second sampled signal having a second plurality of sampled points that originated from the sensing process and was sampled at a second sampling rate, the second sampled points each having an associated measured value and dimension value;
   determining a first shift over the dimension between the first sampled signal and the second sampled signal at a first sampled point of the first sampled signal;
   determining a second shift over the dimension between the first sampled signal and the second sampled signal at a second sampled point of the first sampled signal, the second sampled point being different than the first sampled point;
   determining a calculated shift that is a function of the first shift and the second shift;
   generating a merged signal that includes each of the first plurality of sampled points and each of the second plurality of sampled points shifted based on the calculated shift;
   determining whether there is at least a threshold indication of failure based on analysis of the merged signal; and
   disabling or recommending for removal the component in response to determining that there is at least a threshold indication of failure.

2. The method of claim 1, wherein the first sampled point has a corresponding measured value MV1, and determining the first shift comprises:
   selecting third and fourth consecutive sampled points of the second plurality of sampled points, the third and fourth sampled points having respective corresponding measured values MV3 and MV4, wherein MV3≤MV1<MV4;
   determining a first line having a first slope and a first intercept that passes through the third and fourth sampled points;
   determining a first point on the first line that has measured value MV1; and
   determining the first shift to be a first distance between a first dimension value DV1 that corresponds to the first sampled point and a second dimension value DV2 that corresponds to the first point.

3. The method of claim 1, wherein the second sampled point has a corresponding measured value MV2 and dimension DV3, and determining the second shift comprises:
   selecting third and fourth consecutive sampled points of the second plurality of sampled points, the third and fourth sampled points having respective corresponding measured values MV4 and MV5, wherein MV4≤MV2<MV5;
   determining a second line having a second slope and a second intercept that passes through the third and fourth sampled points;
   determining a second point on the second line that has measured value MV2; and
   determining the second shift to be a second distance between a second dimension value DV3 that corresponds to the second sampled point and a second dimension value DV5 that corresponds to the second point.

4. The method of claim 1, further comprising selecting the first and second sampled points along a ramped portion of the first sampled signal.

5. The method of claim 1, wherein the first and second sampled points are not consecutive sampled points.

6. The method of claim 1, wherein the first and second sampled points are consecutive sampled points.

7. The method of claim 1, further comprising sampling the merged signal to generate a third plurality of sampled points, wherein determining whether there is at least the threshold indication of failure is performed by analyzing the third plurality of sampled points.

8. A condition monitoring system comprising:
a memory configured to store instructions;
a processor disposed in communication with the memory, wherein:
the processor, upon execution of the instructions is configured to:
receive a first sampled signal having a first plurality of sampled points that originated from a process of sensing a component of a system over a dimension, the first sampled signal being sampled at a first sampling rate, and each first sampled point having an associated measured value and a dimension value;
receive a second sampled signal having a second plurality of sampled points that originated from the sensing process and was sampled at a second sampling rate, the second sampled points each having an associated measured value and dimension value;
determine a first shift over the dimension between the first sampled signal and the second sampled signal at a first sampled point of the first sampled signal;
determine a second shift over the dimension between the first sampled signal and the second sampled signal at a second sampled point of the first sampled signal, the second sampled point being different than the first sampled point;
determine a calculated shift that is a function of the first shift and the second shift;
generate a merged signal that includes each of the first plurality of sampled points and each of the second plurality of sampled points shifted based on the calculated shift;
determine whether there is at least a threshold indication of failure based on analysis of the merged signal; and
perform an action to have the component disabled or removed in response to determining that there is at least a threshold indication of failure.

9. The condition monitoring (CM) system of claim 8, wherein the first sampled point has a corresponding measured value MV1, and determining the first shift comprises:
selecting third and fourth consecutive sampled points of the second plurality of sampled points, the third and fourth sampled points having respective corresponding measured values MV3 and MV4, wherein $MV3 \leq MV1 < MV4$;
determining a first line having a first slope and a first intercept that passes through the third and fourth sampled points;
determining a first point on the first line that has measured value MV1; and
determining the first shift to be a first distance between a first dimension value DV1 that corresponds to the first sampled point and a second dimension value DV2 that corresponds to the first point.

10. The condition monitoring (CM) system of claim 8, wherein the second sampled point has a corresponding measured value MV1, and determining the second shift comprises:
selecting third and fourth consecutive sampled points of the second plurality of sampled points, the third and fourth sampled points having respective corresponding measured values MV3 and MV4, wherein $MV3 \leq MV1 < MV4$;
determining a first line having a first slope and a first intercept that passes through the third and fourth sampled points;
determining a first point on the first line that has measured value MV1; and
determining the second shift to be a first distance between a first dimension value DV1 that corresponds to the first sampled point and a second dimension value DV2 that corresponds to the first point.

11. The condition monitoring (CM) system of claim 8, wherein the processor, upon execution of the instructions is configured to select the first and second sampled points along a ramped portion of the first sampled signal.

12. The condition monitoring (CM) system of claim 8, wherein the first and second sampled points are not consecutive.

13. The condition monitoring (CM) system of claim 8, wherein the first and second sampled points are consecutive.

14. The condition monitoring (CM) system of claim 8, wherein the processor, upon execution of the instructions is further configured to sample the merged signal to generate a third plurality of sampled points, wherein determining whether there is at least the threshold indication of failure is performed by analyzing the third plurality of sampled points.

15. A non-transitory computer readable storage medium having one or more computer programs stored therein, the computer programs comprising instructions, which when executed by a processor of a computer system, cause the processor to:
receive a first sampled signal having a first plurality of sampled points that originated from a process of sensing a component of a system over a dimension, the first sampled signal being sampled at a first sampling rate, and each first sampled point having an associated measured value and a dimension value;
receive a second sampled signal having a second plurality of sampled points that originated from the sensing process and was sampled at a second sampling rate, the second sampled points each having an associated measured value and dimension value;
determine a first shift over the dimension between the first sampled signal and the second sampled signal at a first sampled point of the first sampled signal;
determine a second shift over the dimension between the first sampled signal and the second sampled signal at a second sampled point of the first sampled signal, the second sampled point being different than the first sampled point;
determine a calculated shift that is a function of the first shift and the second shift;
generate a merged signal that includes each of the first plurality of sampled points and each of the second plurality of sampled points shifted based on the calculated shift;
determine whether there is at least a threshold indication of failure based on analysis of the merged signal; and
perform an action to have the component to be disabled or removed in response to determining that there is at least a threshold indication of failure.

16. The non-transitory computer readable storage medium of claim 15, wherein the first sampled point has a corresponding measured value MV1, and determining the first shift comprises:
    selecting third and fourth consecutive sampled points of the second plurality of sampled points, the third and fourth sampled points having respective corresponding measured values MV3 and MV4, wherein MV3≤MV1<MV4;
    determining a first line having a first slope and a first intercept that passes through the third and fourth sampled points;
    determining a first point on the first line that has measured value MV1; and
    determining the first shift to be a first distance between a first dimension value DV1 that corresponds to the first sampled point and a second dimension value DV2 that corresponds to the first point.

17. The non-transitory computer readable storage medium of claim 15, wherein the second sampled point has a corresponding measured value MV1, and determining the second shift comprises:
    selecting third and fourth consecutive sampled points of the second plurality of sampled points, the third and fourth sampled points having respective corresponding measured values MV3 and MV4, wherein MV3≤MV1<MV4;
    determining a first line having a first slope and a first intercept that passes through the third and fourth sampled points;
    determining a first point on the first line that has measured value MV1; and
    determining the second shift to be a first distance between a first dimension value DV1 that corresponds to the first sampled point and a second dimension value DV2 that corresponds to the first point.

18. The non-transitory computer readable storage medium of claim 15, wherein the instructions when executed further cause the processor to select the first and second sampled points along a ramped portion of the first sampled signal.

19. The non-transitory computer readable storage medium of claim 15, wherein the first and second sampled points are consecutive.

20. The non-transitory computer readable storage medium of claim 15, wherein the instructions when executed further cause the processor to sample the merged signal to generate a third plurality of sampled points, wherein determining whether there is at least the threshold indication of failure is performed by analyzing the third plurality of sampled points.

\* \* \* \* \*